(12) United States Patent
Hsieh

(10) Patent No.: US 7,856,905 B2
(45) Date of Patent: Dec. 28, 2010

(54) BICYCLE PEDAL THAT IS ASSEMBLED EASILY

(76) Inventor: Chin-Long Hsieh, 5F-1, No. 172, Wuquan 8th St., Xi District, Taichung (TW)

(*) Notice: Subject to any disclaimer, the term of this patent is extended or adjusted under 35 U.S.C. 154(b) by 954 days.

(21) Appl. No.: 11/657,292

(22) Filed: Jan. 24, 2007

(65) Prior Publication Data
US 2007/0193402 A1    Aug. 23, 2007

(30) Foreign Application Priority Data
Jan. 27, 2006    (TW) .............................. 95201964 U

(51) Int. Cl.
*B62M 3/00* (2006.01)
(52) U.S. Cl. .................................... 74/594.6; 74/594.4
(58) Field of Classification Search ............... 74/594.6, 74/594.4; 36/131; *G05G 1/14; B62M 3/08*
See application file for complete search history.

(56) References Cited

U.S. PATENT DOCUMENTS

| | | | | |
|---|---|---|---|---|
| 5,692,415 A * | 12/1997 | Lin | ............................ | 74/594.6 |
| 6,128,973 A * | 10/2000 | Nagano | ...................... | 74/594.6 |
| 7,024,961 B2 * | 4/2006 | Hsiao et al. | ................ | 74/594.6 |
| 2002/0104403 A1 * | 8/2002 | Chen | .......................... | 74/594.6 |
| 2002/0170382 A1 * | 11/2002 | Yang | ........................ | 74/594.6 |

* cited by examiner

*Primary Examiner*—Vinh T. Luong

(57) ABSTRACT

A pedal for a bicycle includes pedal body, and at least one locking hook unit detachably mounted on the pedal body. The locking hook unit includes a fixing hook and a movable hook. Thus, the locking hook unit is locked onto the pedal body by a plurality of locking bolts to assemble the pedal, so that the pedal is assembled and disassembled easily and quickly, thereby facilitating a user assembling and disassembling the pedal. In addition, the locking hook unit has a hollow inside so that after the locking hook unit is attached to the pedal body, the spindle of the pedal body will not be obstructed by the locking hook unit to prevent the mud from being choked between the locking hook unit and the spindle of the pedal body.

16 Claims, 11 Drawing Sheets

BICYCLE PEDAL THAT IS ASSEMBLED EASILY

BACKGROUND OF THE INVENTION

1. Field of the Invention

The present invention relates to a pedal and, more particularly, to a pedal for a bicycle used in a race.

2. Description of the Related Art

A conventional pedal for a racing bicycle comprises a pedal body, and a locking hook unit mounted on the pedal body. The locking hook unit is snapped onto the bottom of one shoe to attach the shoe onto the pedal body. However, the locking hook unit is not assembled easily and conveniently. In addition, the mud is easily choked between the locking hook unit and the spindle of the pedal body, thereby causing inconvenience to the user.

BRIEF SUMMARY OF THE INVENTION

In accordance with the present invention, there is provided a pedal, comprising a pedal body, and at least one locking hook unit detachably mounted on the pedal body and including a fixing hook fixedly mounted on a surface of the pedal body and a movable hook pivotally mounted on the fixing hook and having an elastic torque.

The primary objective of the present invention is to provide a bicycle pedal that is assembled easily, quickly and conveniently.

Another objective of the present invention is to provide a pedal for a bicycle, wherein the locking hook unit is locked onto the pedal body by a plurality of locking bolts to assemble the pedal, so that the pedal is assembled and disassembled easily and quickly, thereby facilitating a user assembling and disassembling the pedal.

A further objective of the present invention is to provide a pedal for a bicycle, wherein the locking hook unit is worked easily and conveniently, thereby decreasing the costs of fabrication.

A further objective of the present invention is to provide a pedal for a bicycle, wherein the locking hook unit has a hollow inside so that after the locking hook unit is attached to the pedal body, the spindle of the pedal body will not be obstructed by the locking hook unit to prevent the mud from being choked between the locking hook unit and the spindle of the pedal body.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
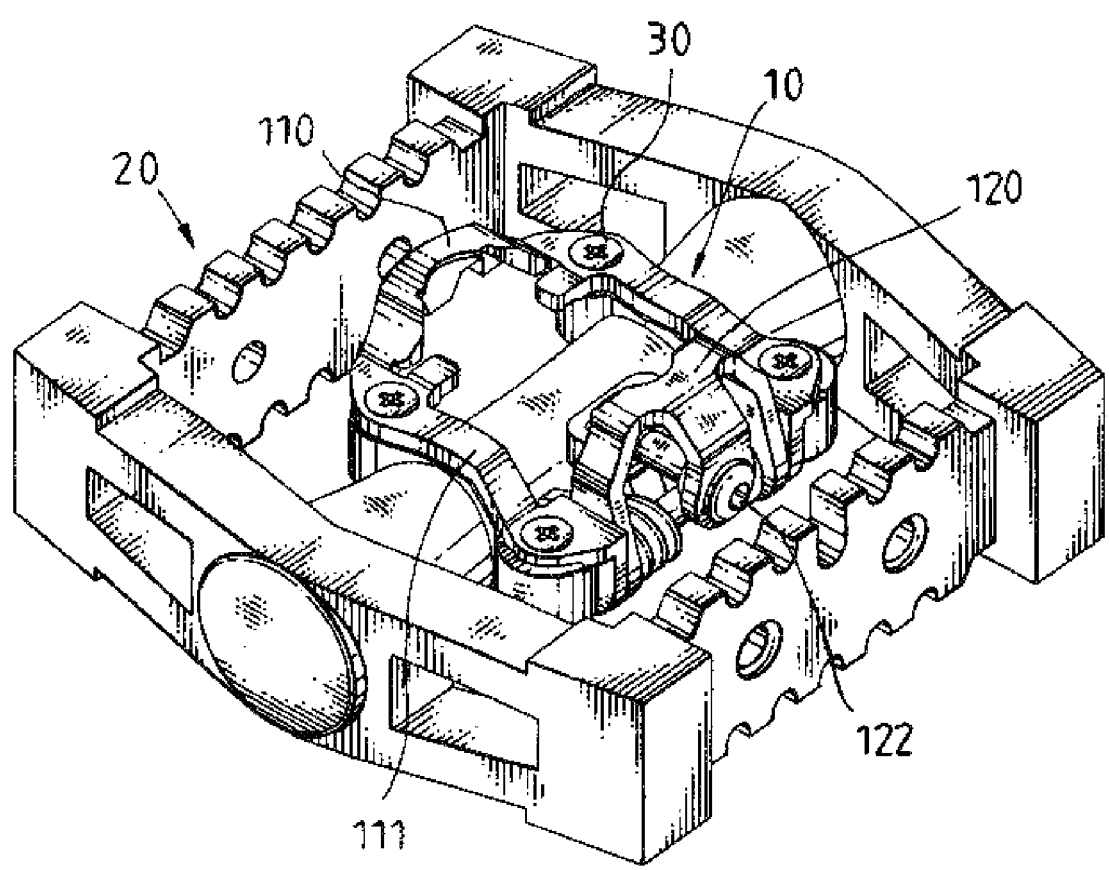
FIG. 1 is a perspective view of a pedal for a bicycle in accordance with the preferred embodiment of the present invention.
Figure 2:
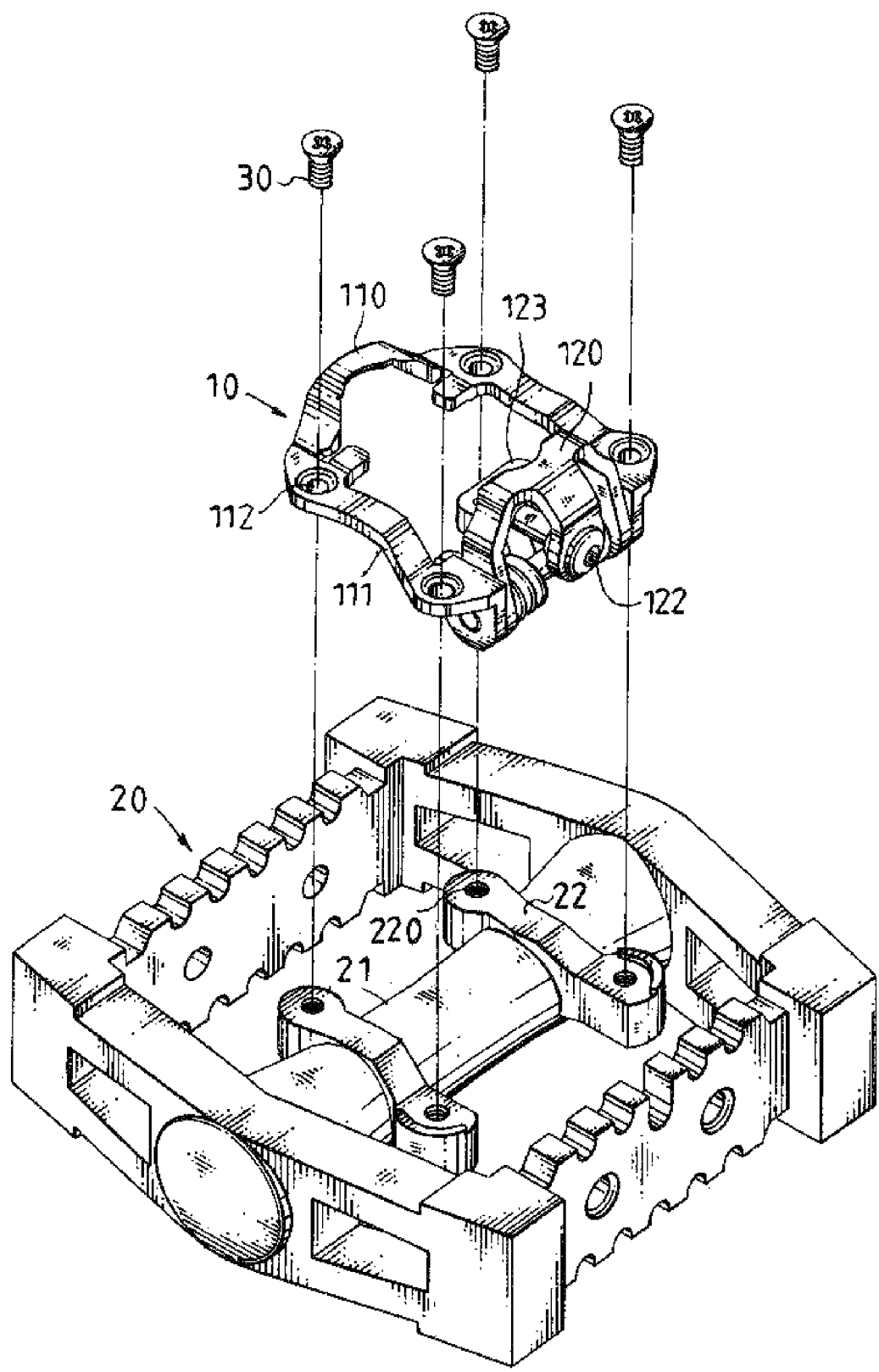
FIG. 2 is a partially exploded perspective view of the pedal as shown in FIG. 1.
Figure 3:
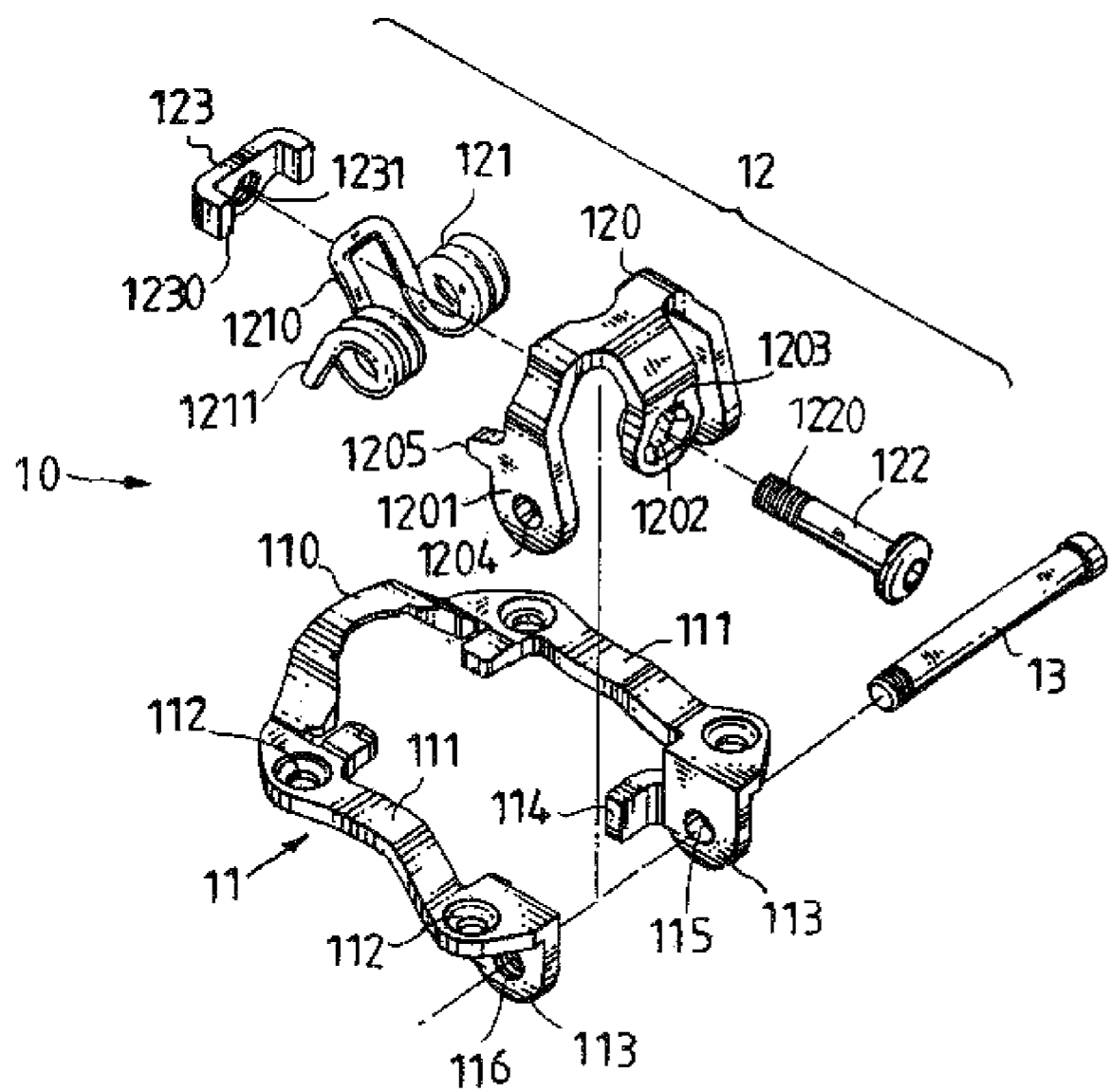
FIG. 3 is an exploded perspective view of a locking hook unit of the pedal as shown in FIG. 1.

Referring to the drawings and initially to FIGS. 1-3, a pedal for a bicycle in accordance with the preferred embodiment of the present invention comprises a pedal body 20, and at least one locking hook unit 10 detachably mounted on the pedal body 20 and including a fixing hook 11 fixedly mounted on a surface of the pedal body 20 and a movable hook 12 pivotally mounted on the fixing hook 11 and having an elastic torque.

The pedal body 20 is especially available for a sports bicycle, such as a BMX/downhill bicycle. In the preferred embodiment of the present invention, the pedal body 20 has a spindle 21 provided with two spaced fixing seats 22 each formed with a plurality of threaded locking holes 220.

The locking hook unit 10 has a hollow inside and is snapped onto the bottom of one shoe (not shown) to attach the shoe onto the pedal body 20.

The fixing hook 11 of the locking hook unit 10 is fixedly mounted on the surface of the pedal body 20 by a plurality of locking bolts 30 which are screwed into the locking holes 220 of the pedal body 20. The fixing hook 11 of the locking hook unit 10 is a substantially U-shaped plate and has a hook portion 110 and two spaced side frames 111 extending from two opposite ends of the hook portion 110. Each of the two side frames 111 of the fixing hook 11 is formed with a plurality of through holes 112 to allow passage of the locking bolts 30. Thus, each of the locking bolts 30 is extended through a respective through hole 112 of the fixing hook 11 and screwed into a respective locking hole 220 of the pedal body 20 to fix the fixing hook 11 of the locking hook unit 10 to the pedal body 20. Each of the two side frames 111 of the fixing hook 11 has a first end extending from the hook portion 110 and a second end formed with a pivot ear 113. The pivot ear 113 extends downward from and is perpendicular to the respective side frame 111. The pivot ear 113 of each of the two side frames 111 has a side formed with a protruding catch plate 114, and the catch plates 114 of the two side frames 111 are directed toward each other. The pivot ear 113 of one of the two side frames 111 has an inside formed with a through bore 115 to allow passage of a pivot bolt 13, and the pivot ear 113 of the other one of the two side frames 111 has an inside formed with a screw bore 116 screwed onto the pivot bolt 13.

The movable hook 12 of the locking hook unit 10 includes a pivot plate 120 pivotally mounted between the two side frames 111 of the fixing hook 11, a torsion spring 121 biased between the pivot plate 120 and the two side frames 111 of the fixing hook 11 to drive the pivot plate 120 toward the two side frames 111 of the fixing hook 11, a press block 123 rested on the torsion spring 121 so that the torsion spring 121 is located between the press block 123 and the pivot plate 120, and an adjusting bolt 122 extended through the pivot plate 120 and the torsion spring 121 and adjustably combined with the press block 123.

The pivot plate 120 of the movable hook 12 has a substantially inverted U-shaped cross-sectional profile and is perpendicular to the two side frames 111 of the fixing hook 11. The pivot plate 120 of the movable hook 12 has two opposite sides each formed with a pivot seat 1201 pivotally mounted on the respective pivot ear 113 of the fixing hook 11 by the pivot bolt 13. The pivot seat 1201 of the pivot plate 120 has an inside formed with a shaft hole 1204 to allow passage of the pivot bolt 13 and has a side formed with a protruding stop block 1205 rested on a top of the respective catch plate 114 of the fixing hook 11 to prevent the pivot plate 120 of the movable hook 12 from being pivoted excessively relative to the fixing hook 11. The pivot plate 120 of the movable hook 12 has a mediate portion formed with a downward extending support seat 1203 to support the adjusting bolt 122. The support seat 1203 of the pivot plate 120 has an inside formed with a passage 1202 to allow passage of the adjusting bolt 122.

The torsion spring 121 of the movable hook 12 is pivotally mounted on the pivot bolt 13 and fully hidden in the pivot plate 120. The torsion spring 121 of the movable hook 12 has a mediate portion formed with a substantially inverted U-shaped pressing bar 1210 rested on the adjusting bolt 122 and has two distal ends each formed with a resting bar 1211 rested on a bottom of the respective catch plate 114 of the fixing hook 11.

The press block 123 of the movable hook 12 is rested on the pressing bar 1210 of the torsion spring 121 to adjust an elastic torque of the torsion spring 121 on the pivot plate 120 by rotation of the adjusting bolt 122. The press block 123 of the movable hook 12 has a middle portion formed with a screw bore 1231 screwed onto a threaded distal end 1220 of the adjusting bolt 122. The press block 123 of the movable hook 12 has two distal ends each formed with a bent edge 1230 enclosed around the pressing bar 1210 of the torsion spring 121 to prevent rotation of the pressing bar 1210 of the torsion spring 121.

The adjusting bolt 122 of the movable hook 12 is extended through the passage 1202 of the pivot plate 120 and the pressing bar 1210 of the torsion spring 121 and screwed into the screw bore 1231 of the press block 123.

In assembly, the movable hook 12 is pivotally mounted on the fixing hook 11 to form the locking hook unit 10. Then, each of the locking bolts 30 is extended through a respective through hole 112 of the fixing hook 11 and screwed into a respective locking hole 220 of the pedal body 20 to fix the fixing hook 11 of the locking hook unit 10 to the pedal body 20 so as to attach the locking hook unit 10 onto the pedal body 20 by the locking bolts 30.

Figure 4:
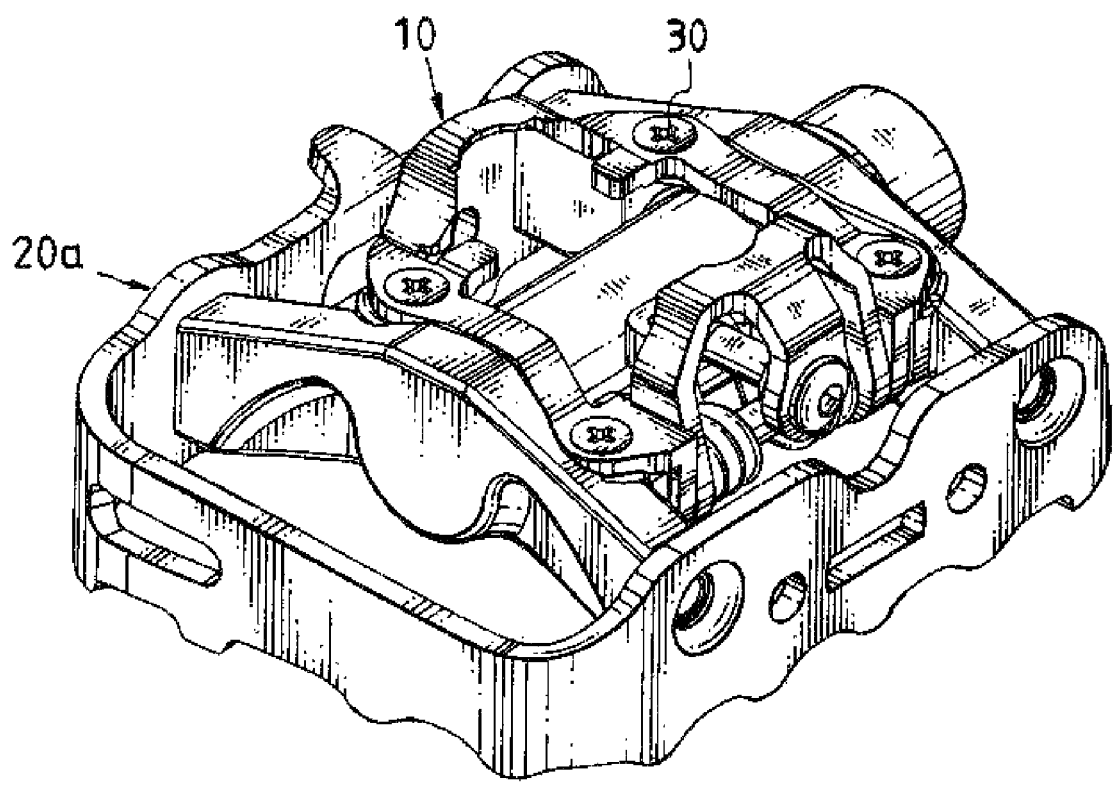
FIG. 4 is a perspective view of a pedal for a bicycle in accordance with another preferred embodiment of the present invention.
Figure 5:
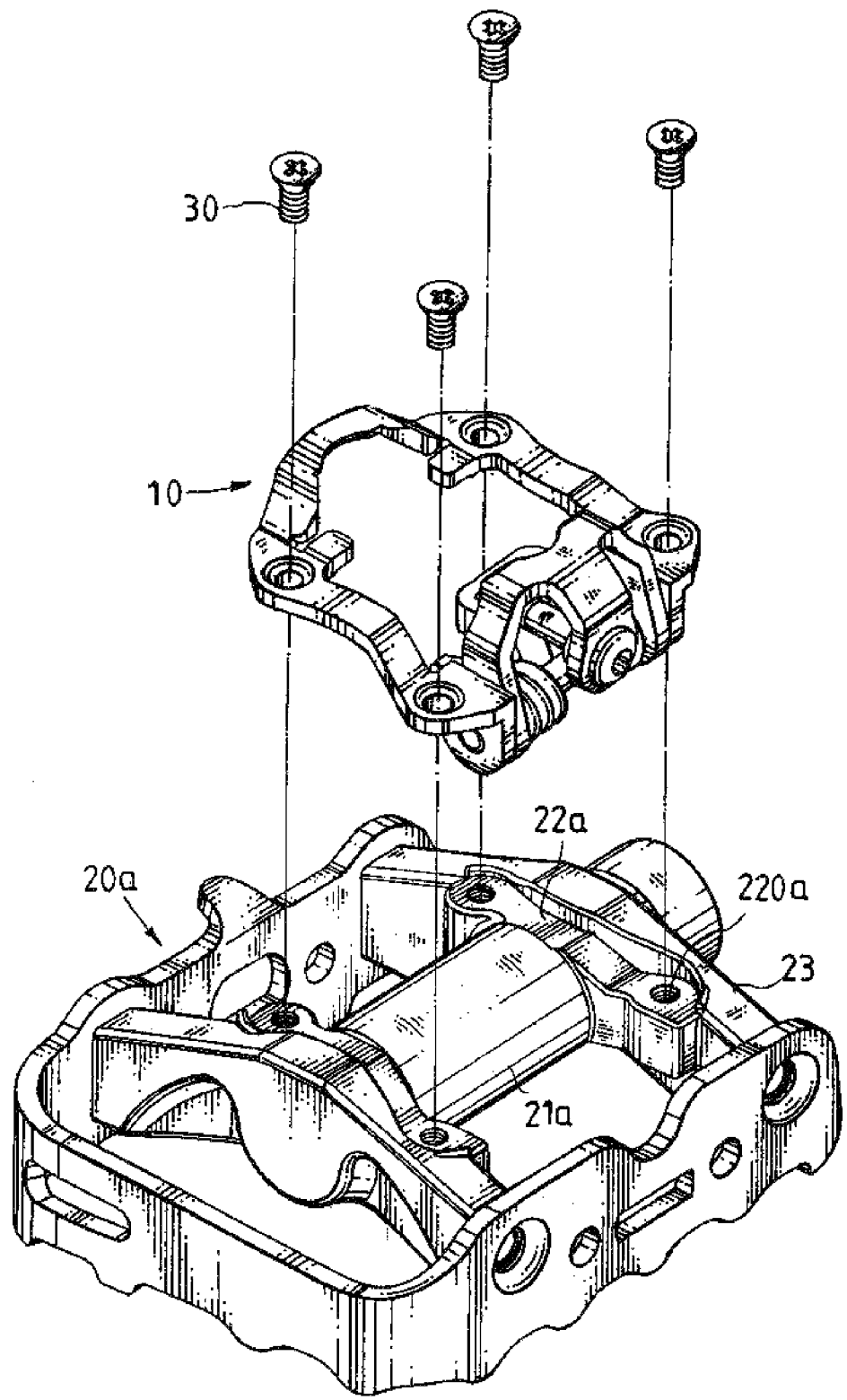
FIG. 5 is a partially exploded perspective view of the pedal as shown in FIG. 4.

Referring to FIGS. 4 and 5, the pedal body 20a is especially available for a mountaineering bicycle, such as a MTB bicycle. In the preferred embodiment of the present invention, the pedal body 20a has a spindle 21a provided with two spaced fixing seats 22a each formed with a plurality of threaded locking holes 220a. Each of the fixing seats 22a is located beside a bushing 23a.

Figure 6:
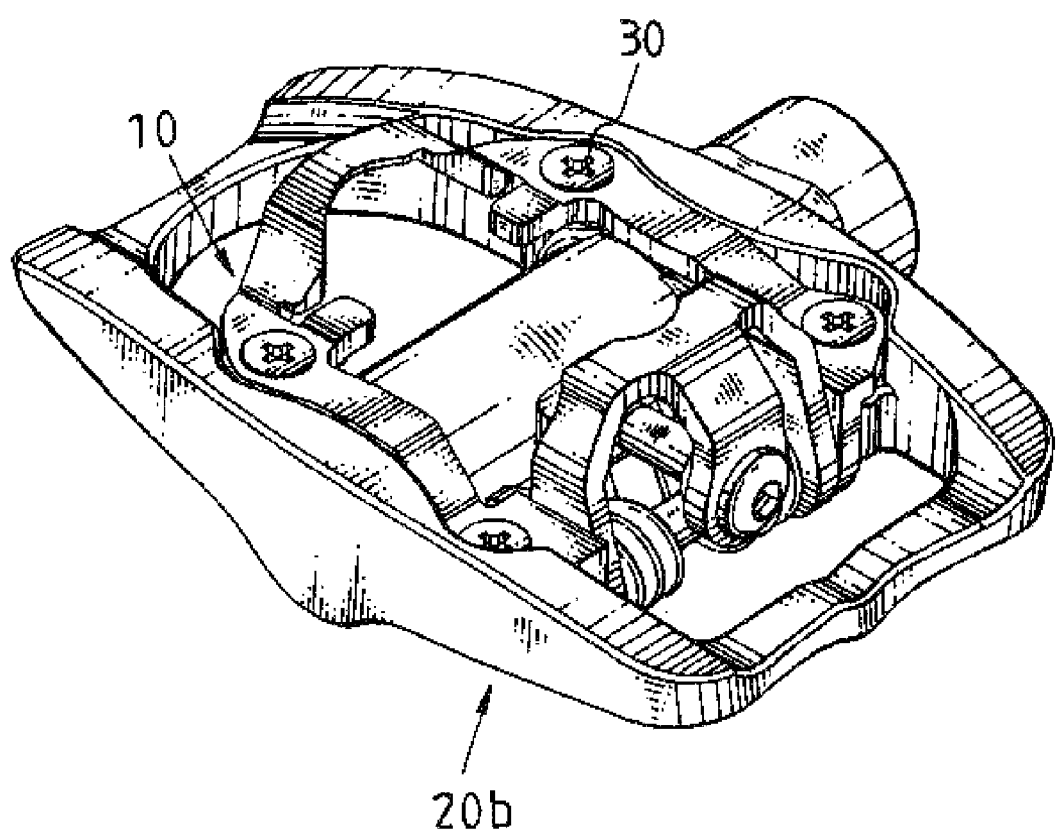
FIG. 6 is a perspective view of a pedal for a bicycle in accordance with another preferred embodiment of the present invention.
Figure 7:
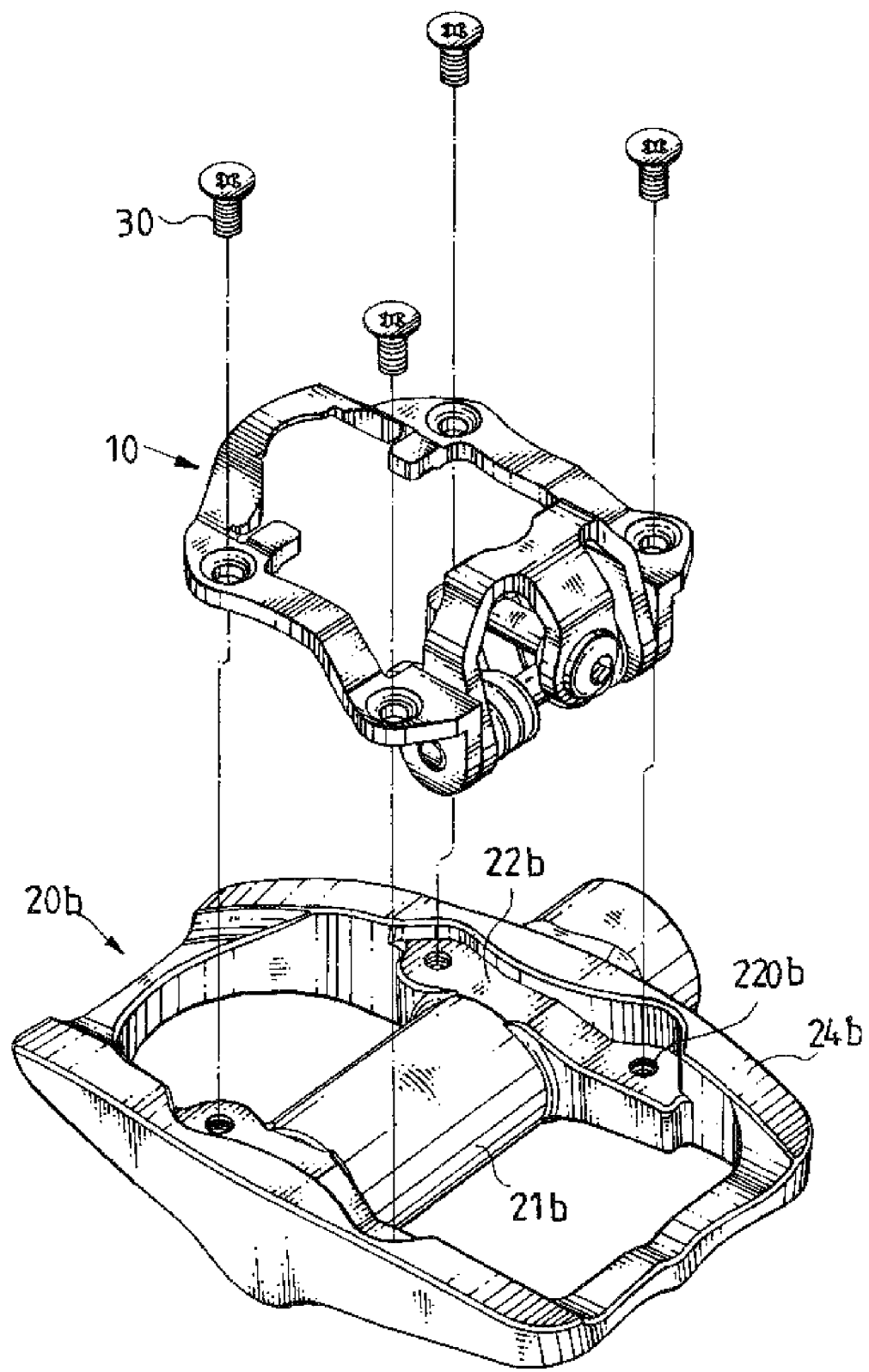
FIG. 7 is a partially exploded perspective view of the pedal as shown in FIG. 6.

Referring to FIGS. 6 and 7, the pedal body 20b is especially available for a road bicycle. In the preferred embodiment of the present invention, the pedal body 20b has a spindle 21b provided with two spaced fixing seats 22b each formed with a plurality of threaded locking holes 220b. Each of the fixing seats 22b is located beside an outer frame 24b.

Figure 8:
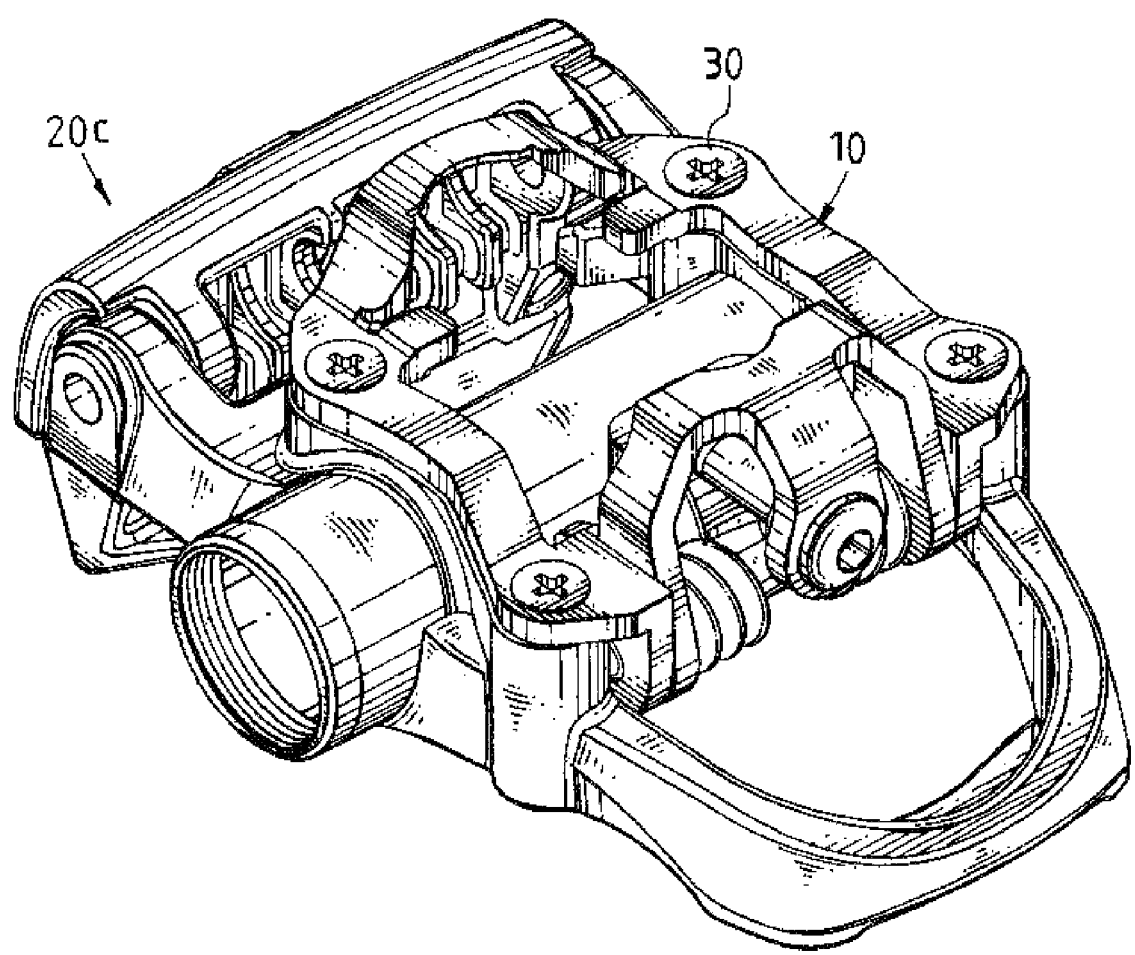
FIG. 8 is a perspective view of a pedal for a bicycle in accordance with another preferred embodiment of the present invention.
Figure 9:
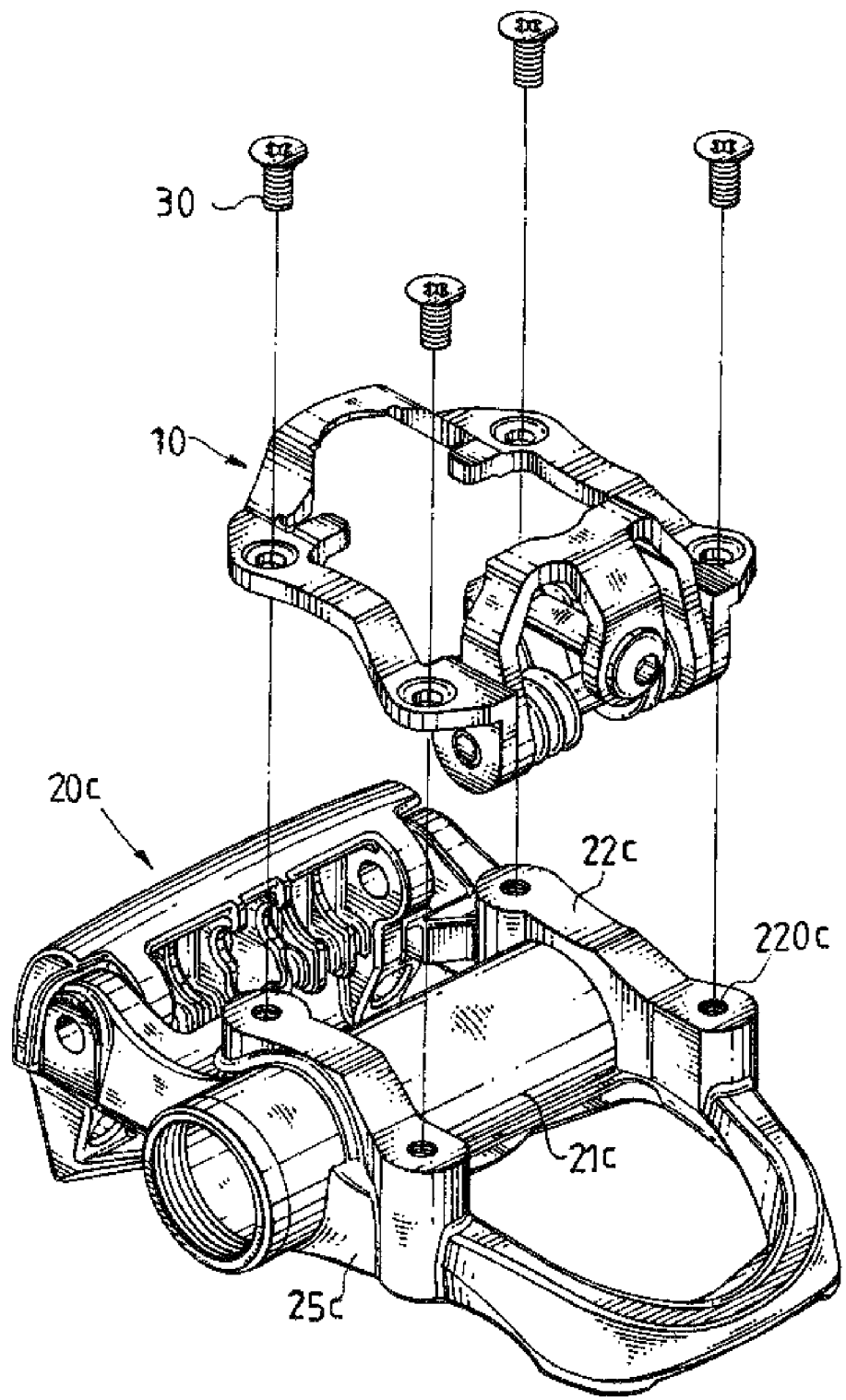
FIG. 9 is a partially exploded perspective view of the pedal as shown in FIG. 8.

Referring to FIGS. 8 and 9, the pedal body 20c is especially available for an indoor exercising bicycle, such as a spinning bicycle. In the preferred embodiment of the present invention, the pedal body 20c has a spindle 21c provided with two spaced fixing seats 22c each formed with a plurality of threaded locking holes 220c. Each of the fixing seats 22c is located on a side frame 25c.

Figure 10:
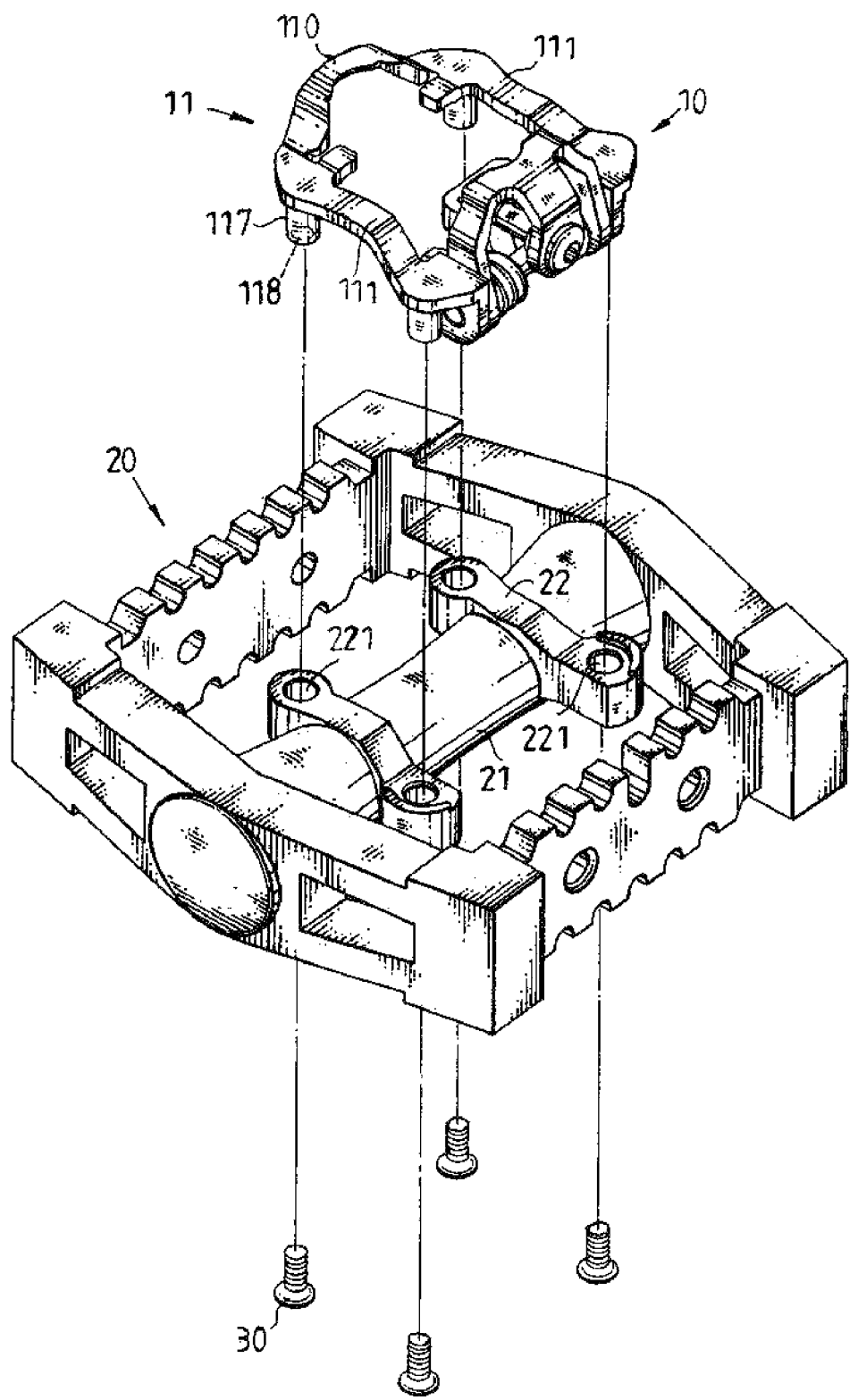
FIG. 10 is a partially exploded perspective view of a pedal for a bicycle in accordance with another preferred embodiment of the present invention.

Referring to FIG. 10, the pedal body 20 has a spindle 21 provided with two spaced fixing seats 22 each formed with a plurality of slots 221, and each of the two side frames 111 of the fixing hook 11 has a side formed with a plurality of downward extending mounting posts 117 each having an inside formed with a screw bore 118 screwed onto the respective locking bolt 30. Thus, each of the locking bolts 30 is extended through a respective slot 221 of the pedal body 20 and screwed into a respective screw bore 118 of the fixing hook 11 to fix the fixing hook 11 of the locking hook unit 10 to the pedal body 20, thereby enhancing the outer appearance of the pedal.

Figure 11:
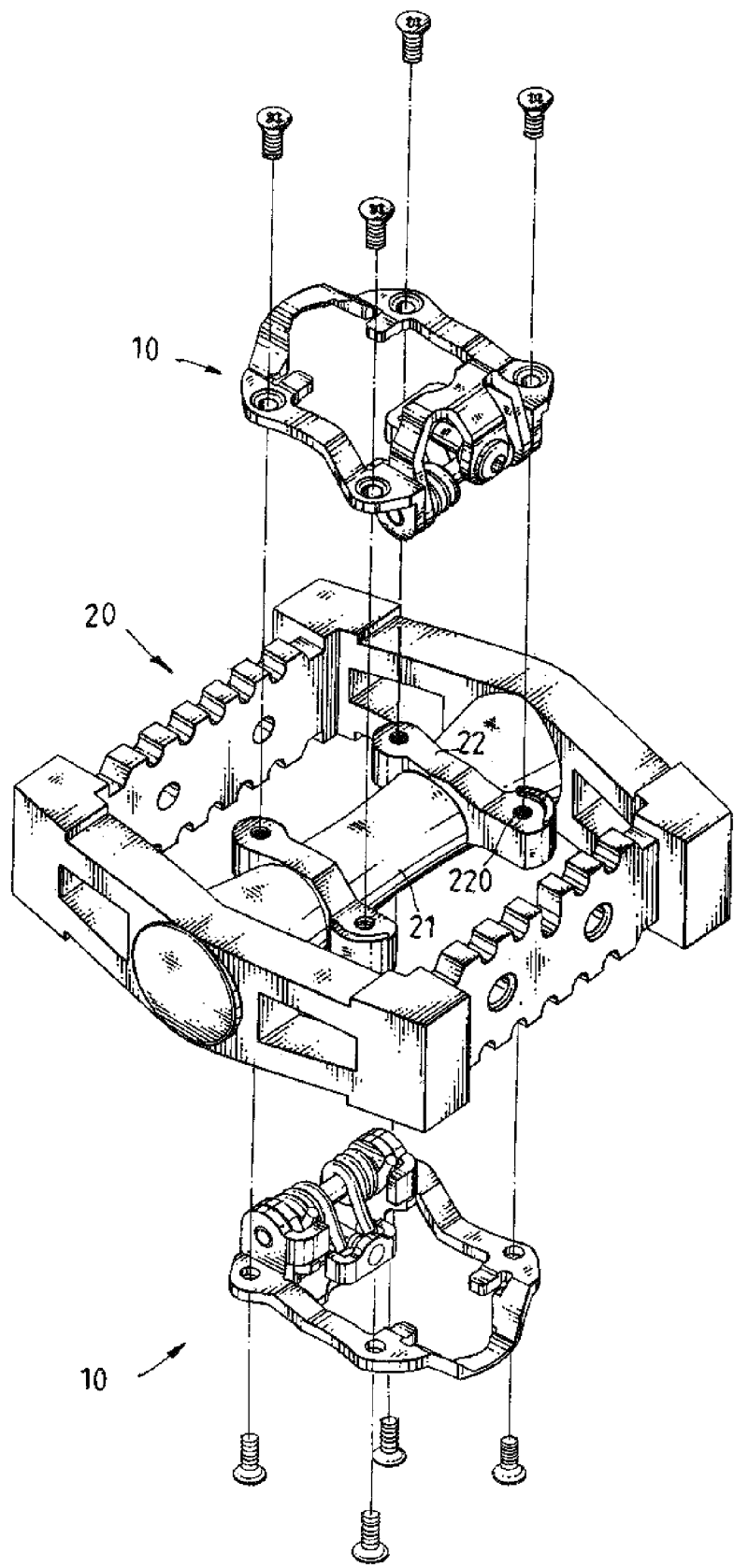
FIG. 11 is a partially exploded perspective view of a pedal for a bicycle in accordance with another preferred embodiment of the present invention.

Referring to FIG. 11, the pedal comprises two opposite locking hook units 10 detachably mounted on two opposite surfaces of the pedal body 20 by a plurality of locking bolts 30.

Accordingly, the locking hook unit 10 is locked onto the pedal body 20 by a plurality of locking bolts 30 to assemble the pedal, so that the pedal is assembled and disassembled easily and quickly, thereby facilitating a user assembling and disassembling the pedal. In addition, the locking hook unit 10 is worked easily and conveniently, thereby decreasing the costs of fabrication. Further, the locking hook unit 10 has a hollow inside so that after the locking hook unit 10 is attached to the pedal body 20, the spindle 21 of the pedal body 20 will not be obstructed by the locking hook unit 10 to prevent the mud from being choked between the locking hook unit 10 and the spindle 21 of the pedal body 20.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A pedal, comprising:

a pedal body;

at least one locking hook unit detachably mounted on the pedal body and including a fixing hook fixedly mounted on a surface of the pedal body and a hook pivotally mounted on the fixing hook and having an elastic torque; wherein:

the fixing hook of the locking hook unit has a hook portion and two spaced side frames extending from two opposite ends of the hook portion; the hook of the locking hook unit includes a pivot plate pivotally mounted between the two side frames of the fixing hook, a torsion spring biased between the pivot plate and the two side frames of the fixing hook to drive the pivot plate toward the two side frames of the fixing hook, a press block rested on the torsion spring so that the torsion spring is located between the press block and the pivot plate, and an adjusting bolt extended through the pivot plate and the torsion spring and adjustably combined with the press block;

each of the two side frames of the fixing hook has a first end extending from the hook portion and a second end formed with a pivot ear; the pivot plate of the hook has two opposite sides each formed with a pivot seat pivotally mounted on the respective pivot ear of the fixing hook by a pivot bolt;

the pivot ear of each of the two side frames has a side formed with a protruding catch plate; and the pivot seat of the pivot plate has a side formed with a protruding stop block rested on a top of the respective catch plate of the fixing hook to prevent the pivot plate of the hook from being pivoted excessively relative to the fixing hook.

2. The pedal in accordance with claim 1, wherein the locking hook unit has a hollow inside, and the fixing hook of the locking hook unit is a substantially U-shaped plate.

3. The pedal in accordance with claim 1, wherein the pivot ear extends downward from and is perpendicular to the respective side frame.

4. The pedal in accordance with claim 1, wherein the pivot ear of one of the two side frames has an inside formed with a through bore to allow passage of the pivot bolt, and the pivot ear of the other one of the two side frames has an inside formed with a screw bore screwed onto the pivot bolt.

5. The pedal in accordance with claim 1, wherein the pivot seat of the pivot plate has an inside formed with a shaft hole to allow passage of the pivot bolt.

6. The pedal in accordance with claim 1, wherein the catch plates of the two side frames are directed toward each other.

7. The pedal in accordance with claim 1, wherein the torsion spring of the hook has two distal ends each formed with a resting bar rested on a bottom of the respective catch plate of the fixing hook.

8. The pedal in accordance with claim 1, wherein the pivot plate of the hook has a substantially inverted U-shaped cross-sectional profile.

9. The pedal in accordance with claim 1, wherein the pivot plate of the hook has a mediate portion formed with a downward extending support seat to support the adjusting bolt, and the support seat of the pivot plate has an inside formed with a passage to allow passage of the adjusting bolt.

10. The pedal in accordance with claim 1, wherein the torsion spring of the hook is pivotally mounted on the pivot bolt and fully hidden in the pivot plate.

11. The pedal in accordance with claim 1, wherein the torsion spring of the hook has a mediate portion formed with a substantially inverted U-shaped pressing bar rested on the adjusting bolt.

12. The pedal in accordance with claim 11, wherein the press block of the hook is rested on the pressing bar of the torsion spring to adjust an elastic torque of the torsion spring on the pivot plate by rotation of the adjusting bolt and has two distal ends each formed with a bent edge enclosed around the pressing bar of the torsion spring to prevent rotation of the pressing bar of the torsion spring.

13. The pedal in accordance with claim 11, wherein the press block of the hook has a middle portion formed with a screw bore screwed onto a threaded distal end of the adjusting bolt which is extended through a passage of the pivot plate and the pressing bar of the torsion spring and screwed into the screw bore of the press block.

14. The pedal in accordance with claim 1, wherein the fixing hook of the locking hook unit is fixedly mounted on the surface of the pedal body by a plurality of locking bolts.

15. The pedal in accordance with claim 14, wherein: each of the two side frames of the fixing hook is formed with a plurality of through holes to allow passage of the locking bolts; the pedal body has a spindle provided with two spaced fixing seats each formed with a plurality of threaded locking holes; each of the locking bolts is extended through a respective through hole of the fixing hook and screwed into a respective locking hole of the pedal body to fix the fixing hook of the locking hook unit to the pedal body.

16. The pedal in accordance with claim 14, wherein: the pedal body has a spindle provided with two spaced fixing seats each formed with a plurality of slots; each of the two side frames of the fixing hook has a side formed with a plurality of downward-extending mounting posts, each having an inside formed with a screw bore screwed onto the respective locking bolt; each of the locking bolts is extended through a respective slot of the pedal body and screwed into a respective screw bore of the fixing hook to fix the fixing hook of the locking hook unit to the pedal body.

* * * * *